No. 648,693. Patented May 1, 1900.
P. J. KLEIN.
TIRE PLUG.
(Application filed Sept. 22, 1899.)

(No Model.)

WITNESSES:

INVENTOR
Peter J. Klein
BY
Garry P. Van Wys,
ATTORNEY

UNITED STATES PATENT OFFICE.

PETER J. KLEIN, OF NEW YORK, N. Y.

TIRE-PLUG.

SPECIFICATION forming part of Letters Patent No. 648,693, dated May 1, 1900.

Application filed September 22, 1899. Serial No. 731,318. (No model.)

*To all whom it may concern:*

Be it known that I, PETER J. KLEIN, a citizen of the United States, residing at New York, (Jamaica,) in the county of Queens and State of New York, have invented a new and useful Tire-Plug, of which the following is a specification.

This invention relates to tire-plugs; and the object thereof is to provide a simple and efficient device by means of which a puncture in a pneumatic tire can be quickly and effectively closed. I attain this object by the device illustrated in the accompanying drawings, in which—

Figure 1:
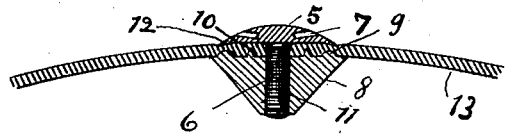
Figure 2:
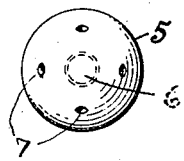
Figure 3:
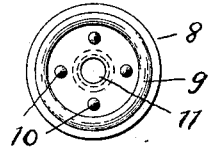

Figure 1 is a central vertical section of my improved tire-plug in position on a tire, a section of which is shown. Fig. 2 is a plan view of the part of the plug which is exposed to view when in use, and Fig. 3 is a plan view of the base of the conical nut.

In the accompanying drawings the same numerals of reference refer to like parts in each of the views, and in the practice of my invention I provide a bolt which consists of a head 5 and screw-threaded shank 6, and the head 5 is provided with a recess or recesses 7, which may be engaged by a tool and by which it may be rotated, as will be readily understood. I also provide a nut 8, which is conical in form, and on the base of which I form an annular bead 9 and a plurality of prongs 10. The nut 8 is also provided with a central screw-threaded passage 11, adapted to engage the screw-threaded shank 6 of the bolt. The head 5 of the plug has a convex outer surface, and the inner surface is substantially flat from the shank to a point adjacent to the edge, where it projects inwardly, as shown at 12, thereby giving the inner surface of the head a dish-shaped appearance, and the inwardly-directed part 12 of the head 5 is so proportioned that when the nut is screwed upon the shank 6 the said part 12 will press the tire (indicated by 13) upon the outer edge of the bead 9, as clearly shown in Fig. 1, thereby making a very close connection between the tire and the head and nut and effectively preventing the escapement of any air.

To apply the plug, the nut is screwed upon the shank 6 for a short distance. The said nut is then pushed through the puncture and is then drawn outward by pulling on the head of the bolt until the prongs 10 engage the inner surface of the tire, when the bolt may be rotated by the fingers or pliers until the nut is nearly home, at which time an instrument may be inserted in one or more of the recesses 7 and the bolt may be further rotated, while the prongs 10 will prevent the rotation of the nut, and in this way the parts may be screwed as tight as desired.

While I have described the plug as being applicable to pneumatic tires, it is evident that it may be applied to a variety of uses, and it is also evident that changes can be made in the recesses 7 and in the bead 9 and part 12 without departing from the spirit of my invention, and I reserve the right to make all such changes.

Having thus described my invention, what I claim, and desire to secure by Letters Patent, is—

1. A tire-plug consisting of a bolt having a head, and a nut adapted to be inserted through the puncture in a tubular tire, said nut being provided with prongs whereby the rotation of the same is prevented while the bolt is being screwed therein.

2. A tire-plug comprising a bolt having a head with a convex outer surface, and provided with recesses whereby the same may be rotated, and a nut, conical in form, and provided on the base thereof with an annular bead, and with prongs, substantially as and for the purpose set forth.

3. A tire-plug comprising a bolt having a head the outer surface of which is convex in form, and provided with recesses, the inner surface of said head being dish-shaped in form, and a washer conical in form, and provided on the base thereof with an annular bead with which the inwardly-directed part of the head coöperates, said nut being also provided with prongs, substantially as and for the purpose set forth.

In testimony that I claim the above I have hereto subscribed my name in the presence of two witnesses.

PETER J. KLEIN.

Witnesses:
  AARON SILKMAN,
  G. M. HOWELL.